US010569659B2

(12) United States Patent
Tsuno

(10) Patent No.: US 10,569,659 B2
(45) Date of Patent: Feb. 25, 2020

(54) VEHICULAR CHARGE/DISCHARGE SYSTEM

(71) Applicant: HONDA MOTOR CO., LTD., Minato-Ku, Tokyo (JP)

(72) Inventor: Koichi Tsuno, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 282 days.

(21) Appl. No.: 14/923,556

(22) Filed: Oct. 27, 2015

(65) Prior Publication Data

US 2016/0114693 A1 Apr. 28, 2016

(30) Foreign Application Priority Data

Oct. 28, 2014 (JP) ................................ 2014-219152

(51) Int. Cl.

| H02J 7/00 | (2006.01) |
|---|---|
| B60L 11/18 | (2006.01) |
| H01M 10/42 | (2006.01) |
| B60L 53/20 | (2019.01) |
| B60L 53/60 | (2019.01) |
| B60L 53/30 | (2019.01) |

(Continued)

(52) U.S. Cl.
CPC .......... B60L 11/1816 (2013.01); B60L 53/14 (2019.02); B60L 53/20 (2019.02); B60L 53/30 (2019.02); B60L 53/51 (2019.02); B60L 53/60 (2019.02); B60L 55/00 (2019.02); B60L 58/12 (2019.02); H01M 10/42 (2013.01); H02J 7/0004 (2013.01); H02J 7/0021 (2013.01); H02J 7/0027 (2013.01); H02J 7/0029 (2013.01);

(Continued)

(58) Field of Classification Search
CPC ... Y02T 90/12; Y02T 90/121; Y02T 10/7005; Y02T 90/14; Y02T 90/128; Y02T 90/163; B60L 11/1811; B60L 11/1816; B60L 11/1824; B60L 11/1825; B60L 11/1861
USPC .............. 320/103, 104, 109; 307/10.1, 10.7; 180/65.1, 65.21, 65.29; 700/22; 701/22; 702/60, 61, 63–65; 903/903, 907
See application file for complete search history.

(56) References Cited

U.S. PATENT DOCUMENTS

| 2005/0156562 A1* | 7/2005 | Cohen .................. A47L 9/2857 320/107 |
| 2009/0192655 A1* | 7/2009 | Ichikawa ............ B60L 11/1811 700/291 |

(Continued)

FOREIGN PATENT DOCUMENTS

| EP | 2 733 815 A1 | 5/2014 |
| EP | 2 787 597 A1 | 10/2014 |

(Continued)

Primary Examiner — Richard Isla
Assistant Examiner — Michael N Dibenedetto
(74) Attorney, Agent, or Firm — Carrier Blackman & Associates, P.C.; Joseph P. Carrier; Jeffrey T. Gedeon

(57) ABSTRACT

In a charge/discharge system having a battery mounted in an electric vehicle, a charging station that charges the battery, and a connector that connects the battery of the electric vehicle and the charging station through a power line, there are provided a detector that applies a voltage to a terminal connected to the power line of the connector and detects whether the connector connects the battery and the charging station based on change of the applied voltage, and a controller that controls charge/discharge of the battery through the connector based on the state of charge of the battery memorized in a memory when it is detected that the connector connects the battery and the charging station.

7 Claims, 5 Drawing Sheets

(51) Int. Cl.
  *B60L 53/14* (2019.01)
  *B60L 55/00* (2019.01)
  *B60L 58/12* (2019.01)
  *B60L 53/51* (2019.01)
(52) U.S. Cl.
  CPC ....... *H02J 7/0047* (2013.01); *H01M 2220/20* (2013.01); *H02J 2007/005* (2013.01); *Y02E 60/721* (2013.01); *Y02T 10/705* (2013.01); *Y02T 10/7005* (2013.01); *Y02T 10/7044* (2013.01); *Y02T 10/7055* (2013.01); *Y02T 10/7094* (2013.01); *Y02T 90/121* (2013.01); *Y02T 90/128* (2013.01); *Y02T 90/14* (2013.01); *Y02T 90/163* (2013.01); *Y04S 10/126* (2013.01)

(56) References Cited

U.S. PATENT DOCUMENTS

| | | |
|---|---|---|
| 2010/0076825 A1 | 3/2010 | Sato et al. |
| 2012/0098488 A1 | 4/2012 | Ichikawa |
| 2013/0057210 A1* | 3/2013 | Nergaard ................ B60L 1/003 320/109 |
| 2013/0069425 A1* | 3/2013 | Kanazawa .......... B60L 11/1816 307/9.1 |
| 2013/0088200 A1* | 4/2013 | Kamishima ................ B60L 3/04 320/109 |
| 2014/0232182 A1* | 8/2014 | Kinomura ............. B60L 11/123 307/10.1 |
| 2015/0097526 A1* | 4/2015 | DeDona ............. B60L 11/1838 320/109 |
| 2015/0326050 A1* | 11/2015 | Baek .................. B60L 11/1846 320/137 |

FOREIGN PATENT DOCUMENTS

| | | |
|---|---|---|
| JP | 2010-081722 A | 4/2010 |
| JP | 2013-158218 A | 8/2013 |
| JP | 2014-155377 A | 8/2014 |
| WO | 2013/065374 A2 | 5/2013 |

\* cited by examiner

Prior Art

VEHICULAR CHARGE/DISCHARGE SYSTEM

CROSS-REFERENCE TO RELATED APPLICATION

This application is based upon and claims the benefit of priority from Japanese Patent Application No. 2014-219152 filed on Oct. 28, 2014, the contents of which are incorporated herein by reference.

BACKGROUND OF THE INVENTION

Field of the Invention

This invention relates to a vehicular charge/discharge system, particularly to a system for charging and discharging a battery installed in an electric vehicle including plug-in hybrid vehicle.

Description of Related Art

Vehicular charge/discharge systems have been the subject of various studies in recent years. As seen in the technique described in Patent Document 1 (Japanese Laid-Open Patent Application No. 2013-158218), for example, it has been proposed to charge an electric vehicle battery with electricity from a commercial power supply, and during a time of high power demand or a power outage in the home, to discharge the power stored in the battery and use it to meet the power load in the home.

A point of interest here is that in order to charge or discharge a battery installed in an electric vehicle, it is necessary to detect that the electric vehicle is connected to a charging station used to charge/discharge the battery, namely, that a charge/discharge connector provided unitarily with the charging station is connected to the electric vehicle needs to be detected.

The teaching of Patent Document 1 regarding this point is to provide a user interface (push-button switch) on the electric vehicle side, operate the user interface with a power supply of a vehicle controller in a turned-on state, and perform a communication operation between the vehicle controller and the charging station, thereby enabling to detect connection of the charge/discharge connector.

Easy and quick detection of electric vehicle and charging station (charge/discharge connector) connection is desirable for efficient control of energy required in the home by charging and discharging the battery installed in the electric vehicle. However, the teaching of Patent Document 1 can be presumed to have a shortcoming of not being able to detect connection of the charge/discharge connector when the aforesaid communication operation is impossible, such as when the vehicle controller is in sleep mode.

In order to solve the shortcoming in Patent Document 1, the vehicle controller has to be woken up from sleep mode every time the charge/discharge connector connection is to be detected. Disadvantageously, since other auxiliary equipment installed on the vehicle side operates simultaneously at this time, power drain on the battery may become undesirably large.

SUMMARY OF THE INVENTION

The object of this invention is therefore to overcome these problems by providing a vehicular charge/discharge system capable of easily and accurately detecting that a charge/discharge connector is connected to an electric vehicle and of efficiently controlling charging and discharging of a battery of electric vehicle.

In order to achieve the object, this invention provides a charge/discharge system having a battery mounted in an electric vehicle, a charging station that charges the battery, and a connector that connects the battery of the electric vehicle and the charging station through a power line, comprising: a detector that applies a voltage to a terminal connected to the power line of the connector and detects whether the connector connects the battery and the charging station based on change of the applied voltage; a memory that memorizes a state of charge of the battery; and a controller (24a) that controls charge/discharge of the battery through the connector based on the state of charge of the battery memorized in the memory when it is detected that the connector connects the battery and the charging station.

BRIEF DESCRIPTION OF THE DRAWINGS

The above and other objects and advantages will be more apparent from the following description and drawings in which.

DETAILED DESCRIPTION OF THE INVENTION

A vehicular charge/discharge system according to an embodiment of this invention will be explained with reference to the attached drawings in the following.

Figure 1:
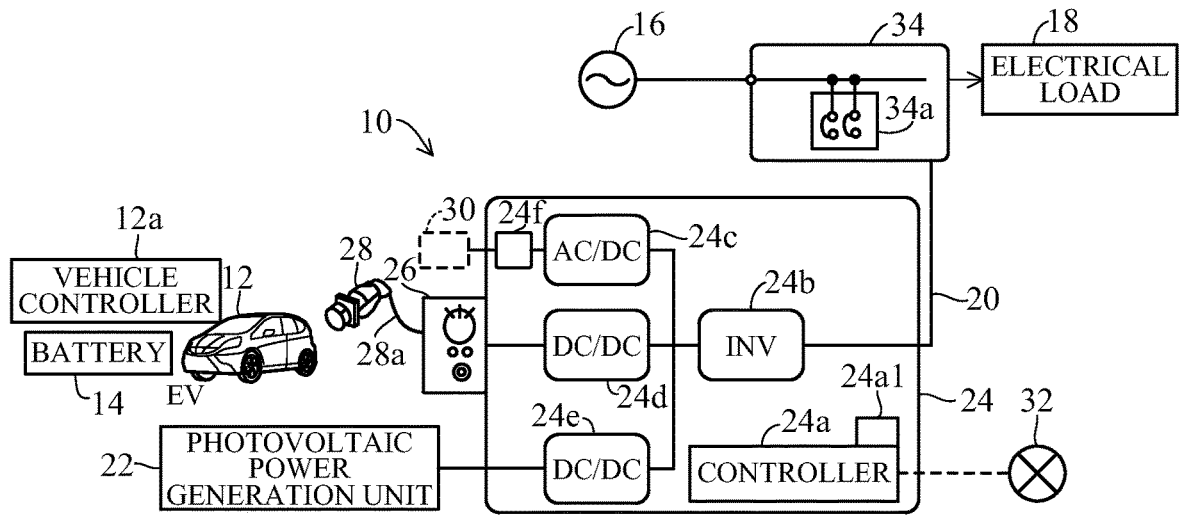
FIG. 1 is an overall conceptual diagram showing a vehicular charge/discharge system according to an embodiment of this invention.
Figure 2:
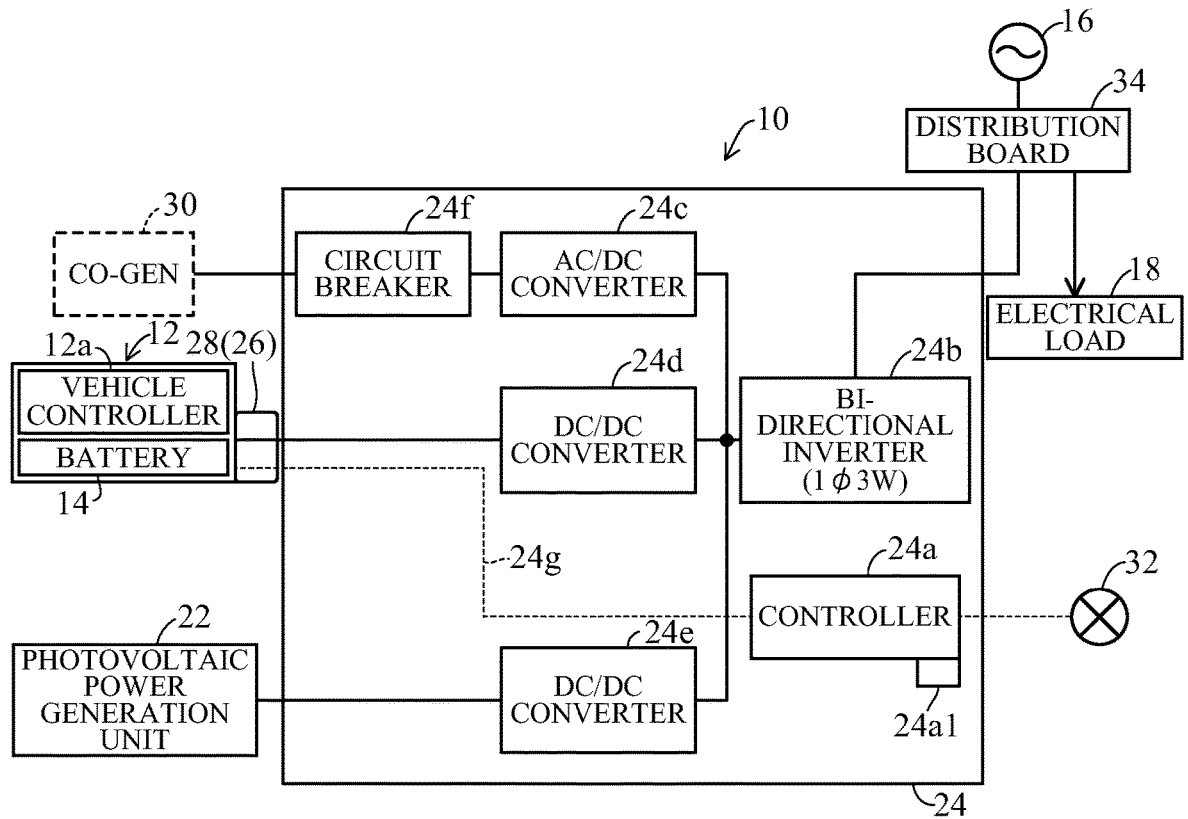
FIG. 2 is a block diagram for explaining the vehicular charge/discharge system shown in FIG. 1 in detail.

FIG. 1 is an overall conceptual diagram showing a vehicular charge/discharge system according to an embodiment of this invention, and FIG. 2 is a block diagram thereof.

In FIG. 1, symbol 10 designates a vehicular charge/discharge system. The vehicular charge/discharge system 10 comprises a battery 14 mounted in an electric vehicle 12 (designated "EV" in FIG. 1, for example), an electrical load (home lighting fixture or the like) 18 connected through a feed line (power line) 20 to a commercial power supply (commercial power network) 16, a photovoltaic power generation unit 22 connectable to the same feed line 20, a charging station 26 that charges the battery 14 of the electric vehicle 12, an integrated power conditioning system (PCS) 24 that controls operation of the foregoings, and a charge/discharge connector 28 that connects the electric vehicle 12 and the charging station 26 through a power line 28a. As termed in this specification, "electric vehicle" includes the concept of "plug-in hybrid vehicle."

The integrated PCS 24 (more exactly, a controller 24a thereof) converts AC power supplied from the commercial power supply 16 to DC power with a bi-directional inverter 24b, steps up DC power generated by the photovoltaic power generation unit 22 to a predetermined voltage with a DC-DC converter 24e, and regulates these DC powers using a bi-directional DC-DC converter 24d, thereby controlling the charging energy to the battery 14.

The controller 24a comprises a microcomputer having a CPU, ROM, RAM, I/O, etc, in which the RAM functions as a memory 24a1 that memorizes a SOC (State of Charge) and SOH (State of Health) of the battery 14. As will be mentioned below, the controller 24a controls charge/discharge of the battery 14 through the connector 28 based on the state of charge of the battery 14 memorized in the memory 24a1 when it is detected that the connector 28 connects the battery 14 and the charging station 26.

When power stored in the battery 14 is to be discharged, the integrated PCS 24 steps up the DC power discharged from the battery 14 to a predetermined voltage with the bi-directional DC-DC converter 24d, and after converting it to AC power with the bi-directional inverter 24b, supplies it to the electrical load 18. Alternatively, the battery 14 can of course be charged by the photovoltaic power generation unit 22 alone or solely by the commercial power supply 16.

Moreover, as indicated by a broken line, the vehicular charge/discharge system 10 can also be equipped with a co-generation unit (designated "CO-GEN" in FIG. 2) 30. In such case, the integrated PCS 24 can convert the AC power generated by the co-generation unit 30 (more exactly, the generator thereof) to DC power using an AC-DC converter 24c and thereafter store it in the battery 14 or use the bi-directional inverter 24b to convert it to predetermined AC power to be supplied to the electrical load 18.

The integrated PCS 24 has a circuit breaker 24f for protecting the electrical load 18 when the commercial power supply 16 fails owing to a lightning strike or other cause.

The controller 24a of the integrated PCS 24 is configured to enable connection to Internet 32 and transmits charge/discharge connector 28 connect-disconnect data and the like via the Internet 32 to a further upstream or downstream control system (not shown). Moreover, the controller 24a is connected so as to enable CAN communication (Control Area Network communication) through a communication line 24g with a vehicle controller 12a (more exactly, a communication unit thereof), and when a power supply of the vehicle controller 12a is turned ON, it acquires SOC and SOH of the battery 14 detected by the vehicle controller 12a, through the communication line 24g.

The charge/discharge system 10 is equipped with a distribution board 34 for appropriately distributing power supplied from the commercial power supply 16 and photovoltaic power generation unit 22 (and co-generation unit 30) to the electrical load 18. As shown in FIG. 1, the distribution board 34 is equipped with an internal switching unit 34a and is configured to switch freely between coordinated operation using the commercial power supply 16 and photovoltaic power generation unit 22 (and co-generation unit 30), and independent operation using only the photovoltaic power generation unit 22, (or the co-generation unit 30,) or the commercial power supply 16.

Connection-detector according to this embodiment will be explained next with reference to FIGS. 3 and 7.

Figure 3:
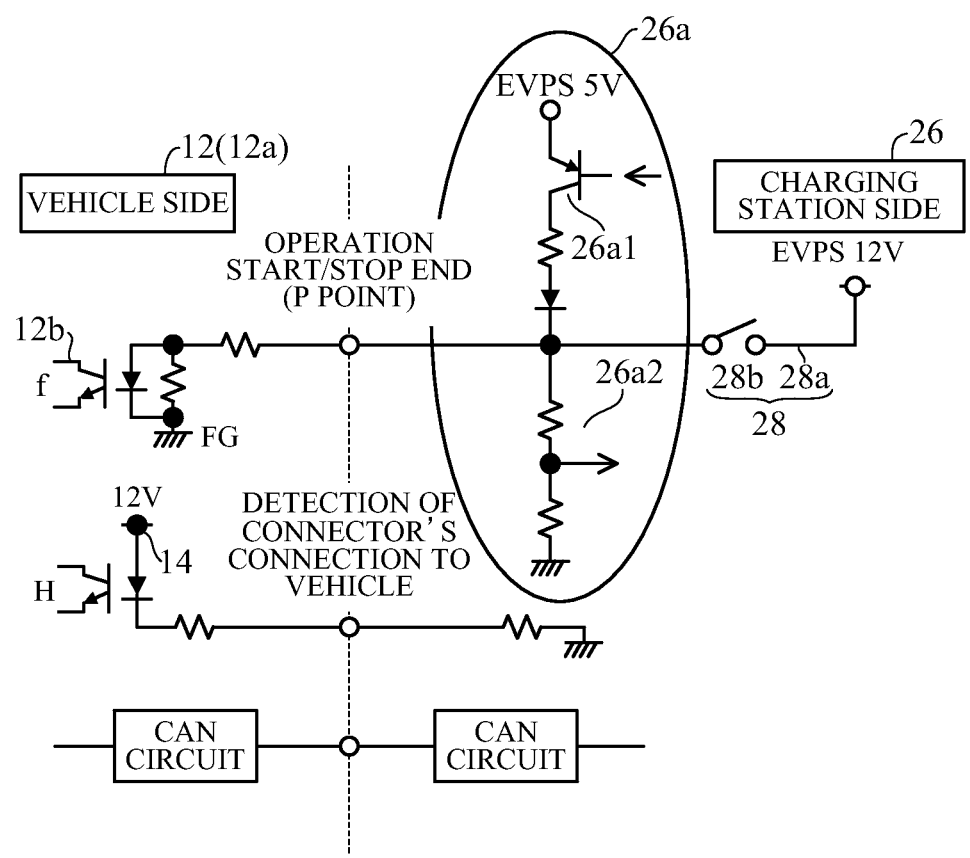
FIG. 3 is a circuit diagram for explaining a connection-detector according to the embodiment of this invention.
Figure 7:
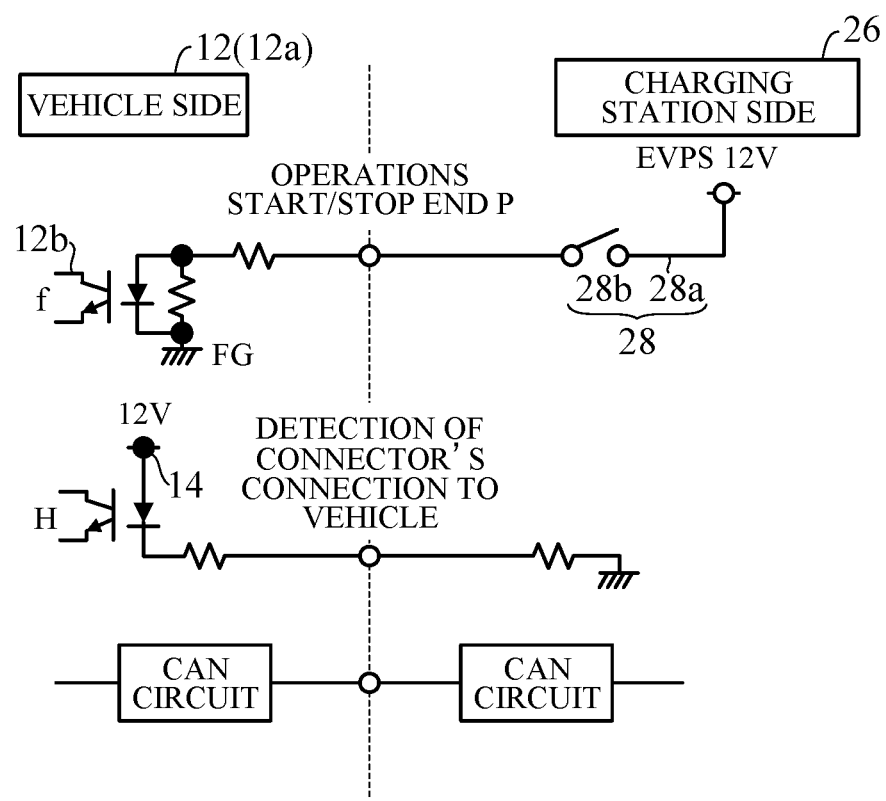
FIG. 7 is a circuit diagram similar to FIG. 3 for explaining a prior art connector's connection-detector.

FIG. 3 is a circuit diagram for explaining the connection-detector associated with the charge/discharge connector 28 according to this embodiment, and FIG. 7 is a circuit diagram similar to FIG. 3 showing a prior art connection-detector.

As shown in FIG. 7, in the prior art, the connection of the charge/discharge connector 28 is detected by turning a relay 28b ON to operate a photo-coupler 12b and by operating the vehicle controller 12a on the vehicle (electric vehicle) 12 side so as to detect its operating voltage (12V) on the commercial power supply 16 side, or by performing data communication between the communication unit of the vehicle controller 12a and the charging station side (more exactly, the controller 24a of the integrated PCS 24). In other words, without turning ON the power supply of the vehicle controller 12a, it is impossible to detect whether or not the charge/discharge connector 28 is connected.

In contrast, the connection-detector according to this embodiment comprises a connector's connection detection circuit 26a provided on a power line 28a of the charge/discharge connector 28 connecting the battery 14 and the charging station 26, that is configured to apply a low voltage of a level (EVPS voltage; e.g., 5V that does not operate the photo-coupler 12b on the electric vehicle 12 side, but operates the integrated PCS 24) to a terminal of the charge/discharge connector 28, more exactly, as shown in FIG. 3, to the base terminal of a PNP transistor circuit 26a1 connected to the power line 28a and to detect change in the impedance outputted from an output of a voltage detection circuit 26a2 of the circuit 26a.

Specifically, when the charge/discharge connector 28 is not connected to the electric vehicle 12 side, the impedance or resistance detected by the connector's connection detection circuit 26a is for the most part affected only by resistance constituted by the connector's connection detection circuit 26a.

On the other hand, when the charge/discharge connector 28 is connected, the impedance or resistance is affected not only by the resistance constituted by the connector's connection detection circuit 26a but also by the resistance possessed by the electric vehicle 12, with the result that impedance or voltage detected downstream of the connector's connection detection circuit 26a (operation start/stop end P point) decreases.

Thus, the connector's connection detection circuit 26a is configured to have the transistor circuit 26a1 connected to a power source of the voltage (5V) and having the base terminal forming the terminal, and a voltage detection circuit 26a2 that is connected to the transistor circuit 26a1 (at a position downstream of the transistor circuit 26a1 upstream of the ground) and produces an output indicating whether the connector (28) connects the battery (14) and the charging station 26.

Therefore, by comparing the detected value with a suitably established threshold value, whether the charge/discharge connector 28 is completely connected to the electric vehicle 12 can be easily and accurately detected (determined).

Thus, owing particularly to the configuration of providing the connector's connection detection circuit 26a on the charging station 26 side and applying the operating power supply of the integrated PCS 24 connected to the charging station 26, connection-disconnection of the charge/discharge connector 28 can be reliably detected without turning on the power supply of the vehicle controller (vehicle control unit) 12a and without exchanging data through the communication line 24g. The relay 28b shown in FIGS. 3 and 7 is a switch that is turned ON during charge/discharge control of the battery 14, by which operation power can be supplied from the charging station 26 side to the electric vehicle 12 side to operate (turn ON) the vehicle controller 12a.

An arrangement can also be adopted that upon detection of a disconnected or incompletely connected state of the charge/discharge connector 28 alerts the user by posting an indication to this effect on a display (not shown) provided in the charging station 26.

The processing performed by the integrated PCS 24 for controlling the charging and discharging operation of the charge/discharge system 10 will be explained next with reference to FIG. 4 flowchart.

Figure 4:
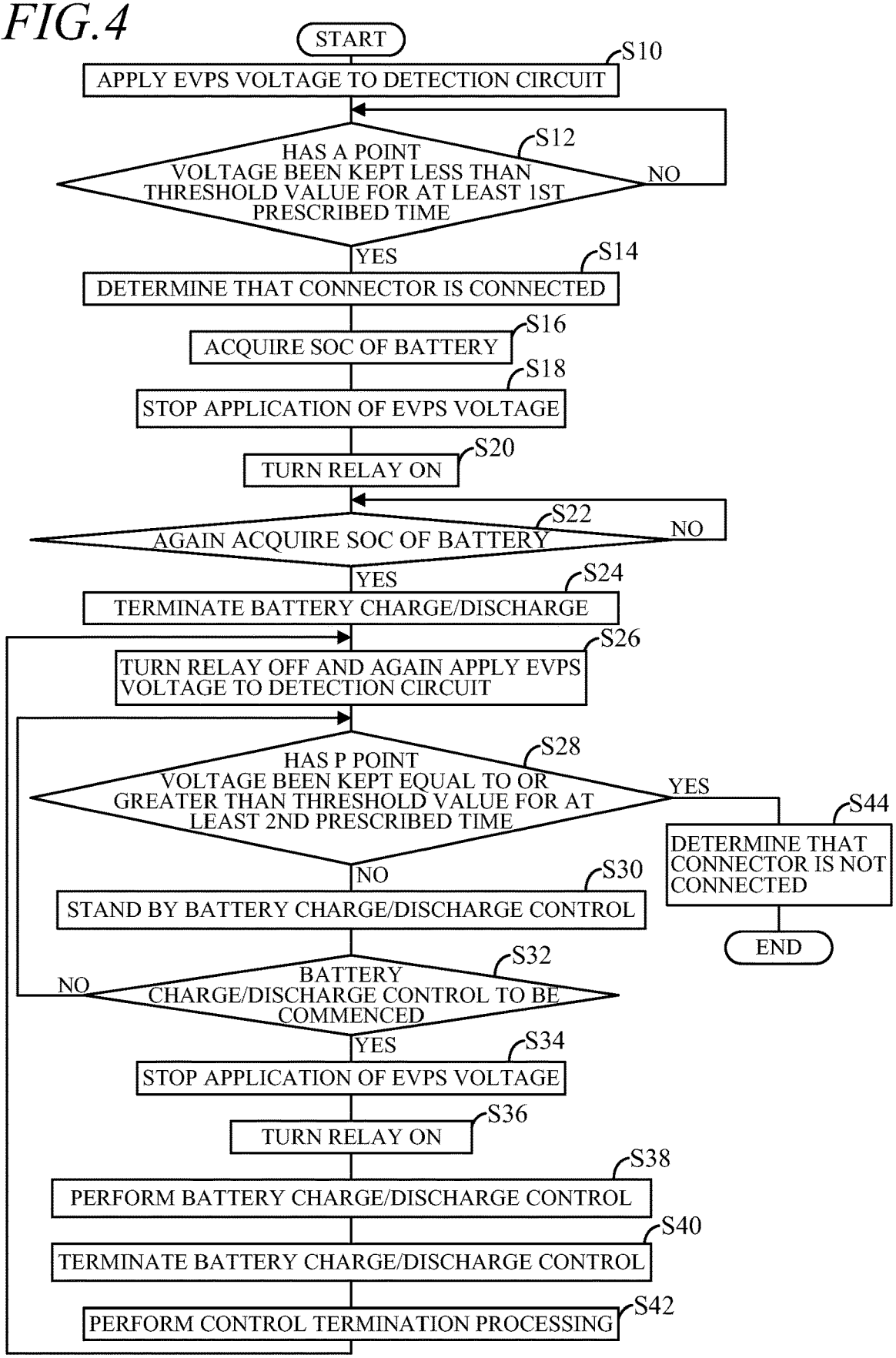
FIG. 4 is a flowchart for explaining processing steps according to the embodiment of this invention.

FIG. 4 flowchart shows a series of processing steps extending from detection of whether or not the charge/discharge connector 28 is connected, through implementation of charge/discharge control of the battery 14, to disconnection (assumption of unconnected state) of the charge/discharge connector 28 from the electric vehicle 12.

The program begins first at S10, in which the aforesaid EVPS voltage is applied to the connector's connection detection circuit 26a to start processing for detecting connection of the charge/discharge connector 28.

The program next proceeds to S12, in which it is determined whether voltage detected at P point (P point voltage) has been kept less than a threshold value (predetermined voltage) for at least a first prescribed time (here S: processing Step).

The determination of S12 is executed repeatedly until the result becomes YES, whereupon the program proceeds to S14, in which it is determined (detected) that the charge/discharge connector 28 is connected and the bit of a connection determination flag is set to 1, and then proceeds to S16, in which SOC and SOH of the battery 14 are acquired.

The SOC and SOH acquired in S16 are values that were stored in the memory 24a1 of the controller 24a upon acquisition in a preceding cycle by data communication performed between the vehicle controller 12a and the controller 24a of the integrated PCS 24 immediately before the electric vehicle 12 and the charging station 26 (more exactly, the integrated PCS 24) became disconnected.

The program next proceeds to S18, in which application of the EVPS voltage to the connector's connection detection circuit 26a is stopped, and to S20, in which the relay 28b is turned ON to operate the vehicle controller 12a. The program then proceeds to S22, in which current SOC and SOH of the battery 14 are acquired from the vehicle controller 12a through the communication line 24g and stored in the memory 24a1, and to S24, in which processing for terminating charge/discharge of the battery 14 is performed.

Processing for terminating charge/discharge of the battery 14 is performed in S24 at this point in view of the possibility that processing for terminating charge/discharge control may not have been satisfactorily performed in the preceding cycle owing to a power outage of the commercial power supply 16 or other cause at the time of attempting to perform the charge/discharge control.

Upon completion of the processing for terminating charge/discharge control, the program proceeds to S26, in which the relay 28b is turned OFF to reduce consumption of battery 14 power, and the EVPS voltage is again applied to the connector's connection detection circuit 26a. With this, if the charge/discharge connector 28 should be disconnected before performing charge/discharge control explained later, the disconnected state thereof can be reliably detected.

The program then proceeds to S28, in which it is determined whether P point voltage has been kept equal to or greater than the threshold value (predetermined voltage) for at least a second prescribed time.

When the result in S28 is NO, from which it is determined that the charge/discharge connector 28 is not disconnected, the program proceeds to S30, in which it is determined to stand by the battery charge/discharge control, and to S32, in which it is determined whether the battery charge/discharge control is to be commenced. When the result in S32 is NO, the aforesaid processing of S28 and S30 is repeated until the battery charge/discharge control start conditions are satisfied.

In the determination (detection) of connection-disconnection of the charge/discharge connector 28 in S28, the second prescribed time can be set shorter than the first prescribed time in view of the fact that the charge/discharge connector 28 was already once confirmed to be connected in S12.

The charge/discharge control (energy management) in this embodiment will now be explained.

In this embodiment, control is performed based on relationship between power demand (power consumption) by the home electrical load 18 and power output by the photovoltaic power generation unit 22 of, inter alia, charging (or not) of the battery 14 with power generated by the photovoltaic power generation unit 22 and discharging of power from the battery 14 to reduce purchase of power from the commercial power supply 16.

To be more concrete, power generated by the photovoltaic power generation unit 22 is compared with power consumed by the electrical load 18 in order to control charging and discharging of the battery 14, so that at the time of charging of the battery 14, use of power supplied from the commercial power supply 16 to charge the battery 14 is limited to a least extend (i.e., the battery 14 is not rarely charged using power purchased from the commercial power supply 16).

Therefore, when, for example, the average power output of the photovoltaic power generation unit 22 is 700 W or greater for 300 seconds, charge control of the battery 14 is performed, and when the power output of the photovoltaic power generation unit 22 is determined to be particularly large (e.g., when the aforesaid average is 1,500 W or greater), an allowable amount of power consumption by the electrical load 18 (e.g., 700 W) is subtracted from the power output of the photovoltaic power generation unit 22 and the remaining excess amount is used as power for charging the battery 14.

When the power output of the photovoltaic power generation unit 22 is determined to be medium (aforesaid average is less than 1,500 W, but not less than 700 W), the allowable amount of power consumption of the electrical load 18 is lowered to 450 W and the excess is used as power for charging the battery 14.

On the other hand, when the power output of the photovoltaic power generation unit 22 is low (e.g., average of less than 700 W for 300 seconds), the aforesaid charge control is not performed. Moreover, discharge control is performed to supply power from the battery 14 to the electrical load 18 taking into account the SOC acquired in S22 and stored in the memory 24a1 and an amount of power consumption by the electrical load 18.

Thus this embodiment is configured to charge the battery 14 with power generated by the photovoltaic power generation unit 22 without receiving supply of power from the commercial power supply 16, as much as possible.

In this case, as explained with reference to FIGS. 1 and 2, direct current generated by the photovoltaic power generation unit 22 is transformed to a predetermined voltage by the DC-DC converter 24e and bi-directional DC-DC converter 24d and supplied through the charge/discharge connector 28 to charge the battery 14, and the distribution board 34 is controlled to cut off power supply from the commercial power supply source 16.

Returning to the explanation of FIG. 4, when, as set forth in the foregoing, it is determined in S32 based on SOC of the battery 14, power output of the photovoltaic power generation unit 22 and power consumption demanded by the electrical load 18 that charge/discharge control of the battery 14 is to be commenced, the program proceeds to S34, in which application of the EVPS voltage to the circuit 26a is stopped, and then to S36, in which the relay 28b is turned back ON to perform the aforesaid charge/discharge control in S38.

Moreover, when it is determined after this that no more charge/discharge control is necessary or that charge/discharge control should not be performed because power consumption in the electrical load 18 has increased, charge/discharge control is terminated (S40) and processing for terminating charge/discharge is performed (S42) similarly to in S24.

The program next returns to S26 to perform processing for detecting connection of the charge/discharge connector 28, and when the result in S28 is YES, it is determined that the charge/discharge connector 28 was disconnected from the electric vehicle 12 and the bit of the connection determination flag is reset to 0.

When the result of S28 is YES, the program proceeds to S44, in which it is determined (detected) that the charge/discharge connector 28 is not connected and the program is terminated.

Figure 5:
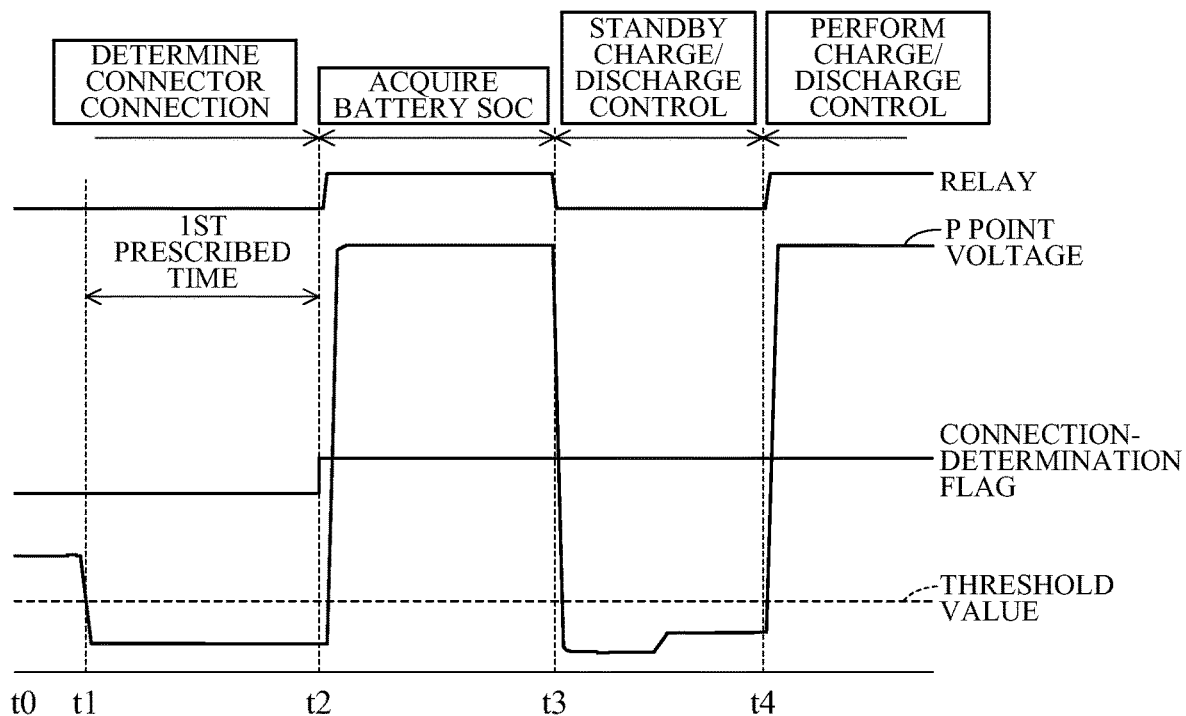
FIG. 5 is a time chart for explaining processing of the flowchart of FIG. 4.
Figure 6:
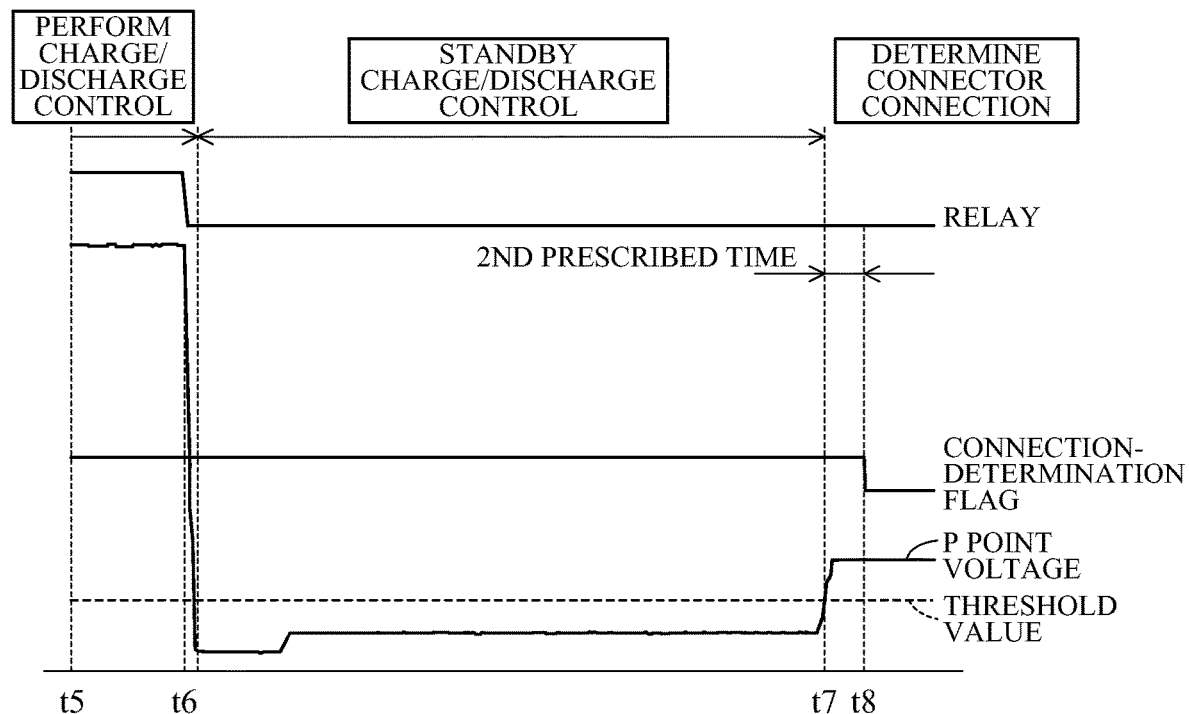
FIG. 6 is a time chart similar to FIG. 5 for explaining processing of the flowchart of FIG. 4.

FIGS. 5 and 6 are time charts for explaining the aforesaid processing.

Now to explain, processing is started at time t0, and when, after application of the EVPS voltage to the connector's connection detection circuit 26a, the charge/discharge connector 28 is connected to the electric vehicle 12 at time t1, the P point voltage falls below the threshold value, and when this state has been maintained for the first prescribed time up to time t2, the charge/discharge connector 28 is determined (detected) to be connected to the electric vehicle 12, the bit of the connection determination flag is set to 1, and the vehicle controller 12a is turned ON by stopping application of the EVPS voltage and the relay 28b is turned ON, whereby the 12V battery voltage of the electric vehicle 12 comes to act on the P point, thereby also increasing the detected P point voltage. Moreover, the controller 24a of the integrated PCS 24 commences CAN communication with the vehicle controller 12a to acquire battery 14 SOC and SOH.

Upon acquiring the SOC of the battery 14 at time t3, the relay 28b is once turned OFF and the EVPS voltage is again applied to establish a charge/discharge control standby mode. Then when conditions for commencing performance of charge/discharge control are determined to be satisfied at time t4, the application of the EVPS voltage is again stopped and the relay 28b is turned ON to perform the battery charge/discharge control.

When termination of charge/discharge control performance is instructed at time t6, the relay 28b is turned OFF and the EVPS voltage is then applied to re-stablish the charge/discharge control standby mode. Moreover, the turning OFF of the relay 28b puts the vehicle controller 12a in sleep mode, and CAN communication of the integrated PCS 24 with the controller 24a is terminated.

Next, when the charge/discharge connector 28 is disconnected at time t7, the P point voltage becomes equal to or greater than the threshold value, and when this state has been maintained for the second prescribed time up to time t8, the charge/discharge connector 28 is determined (detected) to be disconnected from the electric vehicle 12 (to have assumed an unconnected condition) and the bit of the connection determination flag is reset to 0. The EVPS voltage is maintained in an ON state to continue detecting connection of the charge/discharge connector 28 also after time t8.

In other words, this embodiment is configured to perform processing for detecting connection of the charge/discharge connector 28 at all times other than when the relay 28b is ON and the vehicle controller 12a in operation. And when the relay 28b is ON, connection/disconnection of the charge/discharge connector 28 can be determined by CAN communication between the vehicle controller 12a and the controller 24a without relying on the connector's connection detection circuit 26a. The integrated PCS 24 can therefore constantly monitor connection-disconnection of the charge/discharge connector 28.

Another possibility is to count the number of times that the user determined not to perform charge/discharge control notwithstanding that the charge/discharge connector 28 was determined to be connected to the electric vehicle 12 and to optimize the charge/discharge connector 28 periodic maintenance interval based on the result.

As stated above, the embodiment is configured to have a charge/discharge system having a battery (14) mounted in an electric vehicle (12), a charging station (26) that charges the battery (14), and a connector (28) that connects the battery (14) of the electric vehicle (12) and the charging station (26) through a power line (28a), comprising: a detector (24a, 26a) that applies a voltage to a terminal connected to the power line of the connector (28) and detects whether the connector (28) connects the battery (14) and the charging station (26) based on change of the applied voltage; a memory (24a1) that memorizes a state of charge of the battery (14); and a controller (24a) that controls charge/discharge of the battery (14) through the connector (28) based on the state of charge of the battery (14) memorized in the memory (24a) when it is detected that the connector (28) connects the battery (14) and the charging station (26).

Thus, since the charge/discharge system for the electric vehicle battery 14 is configured to apply a voltage to the terminal of the connector 28 for connecting the charging station 26 and the battery 14 of the electric vehicle 12, detect connection of the connector 28 from change in the applied voltage, and control charge and discharge of the battery 14 in accordance with the charged state of the battery 24 upon detecting that the connector 28 is connected, whereby connection-disconnection of the connector 28 can be easily and reliably determined without operating the vehicle controller 12a of the electric vehicle 12, thereby enabling charging and discharging of the electric vehicle battery 14 to be controlled efficiently. As a result, control of battery charging and discharging in a condition with the connector 28 only partially connected can be prevented and wasteful consumption of battery power for an operation solely to check connector connection can be avoided.

In the system, the detector (24a, 26a) applies the voltage of a level that does not operate a vehicle controller (12a) installed in the vehicle (12), whereby connection-disconnection of the connector (28) can be more reliably determined.

In the system, the detector (24a) is provided with a detection circuit (26a) that has a transistor circuit (26a1) connected to a power source of the voltage and having a base terminal forming the terminal, and a voltage detection circuit (26a2) that is connected to the transistor circuit (26a1) and produces an output indicating whether the connector (28) connects the battery (14) and the charging station, whereby, connection-disconnection of the connector 28 can be more reliably determined.

In the system, the vehicle (12) is installed with a vehicle controller (12a) that detects a state of charge of the battery (14), and the controller (24a) applies voltage to the vehicle (12) to operate the vehicle controller (12a) when it is detected that the connector (28) connects the battery (14) and the charging station (26), whereby, in addition to the aforesaid effects, consumption of battery power can be further suppressed.

In the system, the detector (24a, 26a) stops applying the voltage to the terminal when the vehicle controller (12a) is operated by the controller (24a), while continues applying the voltage to the terminal when the vehicle controller is not operated by the controller (24a), whereby, in addition to realizing the aforesaid effects, connector connection-disconnection can be constantly monitored while effectively suppressing consumption of battery power. In other words, connector connection-disconnection can be determined by connection-detector while the vehicle controller is not operating and, similarly to in the prior art, by communication between the vehicle controller 12a and charge/discharge controller when the vehicle controller 12a is operating.

The system further includes: a commercial power supply (16) that supplies power to a feed line (20); a photovoltaic power generation unit (22) that generates power through photovoltaic power generation and supplies the generated power to the feed line (20); and an electrical load (18) connected to the feed line (20); wherein the controller (24a) controls to connect the feed line (20) to the charging station (26) in response to power situation, whereby more efficient power control can be achieved.

In the system, the controller (24a) controls to connect the feed line (20) to the charging station (26) such that power discharged from the battery (14) is supplied to the electrical load (18), whereby more efficient power control can be achieved.

In the system, the controller (24a) controls to connect the feed line (20) to the charging station (26) such that the battery (14) is supplied with the power generated by the photovoltaic power generation unit (22), whereby more efficient power control can be achieved.

While the invention has thus been shown and described with reference to specific embodiment, it should be noted that the invention is in no way limited to the details of the described arrangement; changes and modifications may be made without departing from the scope of the appended claims.

What is claimed is:

1. A charge/discharge system having a battery mounted in an electric vehicle, a charging station that charges the battery, and a connector that connects the battery of the electric vehicle and the charging station through a power line, comprising:
    a detection circuit formed on a power line of the connector on the side of the charging station independently from the electric vehicle when the battery of the electric vehicle and the charging station are disconnected, the detection circuit having a PNP transistor circuit connected to a power source and a voltage detection circuit including: a first resistor connected to the PNP transistor circuit; a diode connected to the first resistor; a second resistor connected to the diode; and a third resistor connected to the second resistor and grounded, the detection circuit being formed on the power line between the diode and the second resistor;
    a detector that applies a voltage from the power source to a terminal of the PNP transistor circuit of the detection circuit and detects whether the connector connects the battery and the charging station based on change of the applied voltage output from the detection circuit between the second resistor and the third resistor;
    a memory that stores a state of charge of the battery; and
    a controller that controls charge/discharge of the battery through the connector based on the state of charge of the battery stored in the memory when it is detected that the connector connects the battery and the charging station,
    wherein the vehicle is installed with a vehicle controller that detects a state of charge of the battery, and the controller applies voltage to the vehicle to operate the vehicle controller when it is detected that the connector connects the battery and the charging station.

2. The charge/discharge system according to claim 1, wherein the detector applies the voltage of a level that does not operate a vehicle controller installed in the vehicle.

3. The charge/discharge system according to claim 2, wherein the PNP transistor circuit has a base terminal forming the terminal, and the voltage detection circuit produces an output indicating whether the connector connects the battery and the charging station.

4. The charge/discharge system according to claim 1, wherein the detector stops applying the voltage to the terminal when a vehicle controller is operated by the controller, while continues applying the voltage to the terminal when the vehicle controller is not operated by the controller.

5. The charge/discharge system according to claim 1, further including:
    a commercial power supply that supplies power to a feed line;
    a photovoltaic power generation unit that generates power through photovoltaic power generation and supplies the generated power to the feed line; and
    an electrical load connected to the feed line;
    wherein the controller controls to connect the feed line to the charging station in response to power situation.

6. The charge/discharge system according to claim 5, wherein the controller controls to connect the feed line to the charging station such that the power discharged from the battery is supplied to the electrical load.

7. The charge/discharge system according to claim 5, wherein the controller controls to connect the feed line to the charging station such that the battery is supplied with the power generated by the photovoltaic power generation unit.

* * * * *